(12) United States Patent
Xu et al.

(10) Patent No.: US 11,647,736 B2
(45) Date of Patent: May 16, 2023

(54) ENGINEERED RECIRCULATING AQUACULTURE FISH POND AND FISH CULTURE METHOD

(71) Applicant: Freshwater Fisheries Research Center, Chinese Academy of Fishery Sciences, Wuxi (CN)

(72) Inventors: Gangchun Xu, Wuxi (CN); Hongxia Li, Wuxi (CN); Zhijuan Nie, Wuxi (CN); Quanjie Li, Chongqing (CN); Changyou Song, Linyi (CN); Lin Zhang, Changsha (CN); Yuan Yuan, Wuxi (CN); Haojun Zhu, Suzhou (CN); Yi Sun, Jingjiang (CN)

(73) Assignee: FRESHWATER FISHERIES RESEARCH CENTER, CHINESE ACADEMY OF FISHERY SCIENCES, Wuxi (CN)

( * ) Notice: Subject to any disclaimer, the term of this patent is extended or adjusted under 35 U.S.C. 154(b) by 0 days.

(21) Appl. No.: 17/732,193

(22) Filed: Apr. 28, 2022

(65) Prior Publication Data

US 2023/0090467 A1 Mar. 23, 2023

(30) Foreign Application Priority Data

Sep. 18, 2021 (CN) .......................... 202111109872.8

(51) Int. Cl.
*A01K 63/04* (2006.01)
(52) U.S. Cl.
CPC .......... *A01K 63/042* (2013.01); *A01K 63/047* (2013.01)
(58) Field of Classification Search
CPC .............................. A01K 61/10; A01K 63/042
See application file for complete search history.

(56) References Cited

U.S. PATENT DOCUMENTS 3,794,303 A * 2/1974 Hirshon ................ B01F 33/503
261/92
4,481,905 A * 11/1984 Fonseca ............... A01K 63/003
119/261
(Continued)

FOREIGN PATENT DOCUMENTS

CN 212184750 U 12/2020

OTHER PUBLICATIONS

Sun Qiyi, Fresh fish production in cities and towns—Factory fish farming and family fish farming, Nov. 1988, pp. 8-9, Beijing Publishing House.
(Continued)

*Primary Examiner* — Peter M Poon
*Assistant Examiner* — Shada Mohamed Alghailani
(74) *Attorney, Agent, or Firm* — Zhigang Ma

(57) ABSTRACT

An engineered recirculating aquaculture fish pond and a fish culture method are provided. The engineered recirculating aquaculture fish pond is simple to operate, has strong adaptability to different culture environments or culture varieties, and is not only suitable for large-scale aquaculture enterprises but also suitable for small-scale farmers. An aeration water lifting device is designed to simultaneously perform aeration and drainage, which can reduce the use of electric equipment, decrease the production and maintenance cost, improve the cost performance of single equipment, and save the internal use space of the pond. Nozzles are arranged in more than two directions, which is convenient for performing aeration in different directions, uniformly dispersing impurities carried in water in a deep ditch, intercepting to reduce local blockage, improving a single utilization rate of an intercept structure, and preventing heavier impurities from accumulating at a channel bottom of the deep ditch.

4 Claims, 5 Drawing Sheets

(56) References Cited

U.S. PATENT DOCUMENTS

| | | | | |
|---|---|---|---|---|
| 5,478,208 A | * | 12/1995 | Kasai | C02F 7/00 |
| | | | | 4/491 |
| 5,595,691 A | * | 1/1997 | Hsu | B01F 33/503 |
| | | | | 261/123 |
| 6,241,897 B1 | * | 6/2001 | Hanson | B01F 25/3121 |
| | | | | 210/627 |
| 6,328,289 B1 | * | 12/2001 | Becchi | A01K 63/042 |
| | | | | 261/84 |
| 11,191,256 B1 | * | 12/2021 | Landru | A01K 63/047 |
| 2006/0279006 A1 | * | 12/2006 | Tsai | B01F 23/234 |
| | | | | 261/36.1 |

OTHER PUBLICATIONS

CNIPA, Notification of a First Office Action for CN202111109872.8, dated Jun. 13, 2022.

Freshwater Fisheries Research Center of Chinese, Academy of Fishery Sciences (Applicant), Reply to Notification of a First Office Action for CN202111109872.8, w/ (allowed) replacement claims, dated Jul. 1, 2022.

CNIPA, Notification to grant patent right for invention in CN202111109872.8, dated Aug. 2, 2022.

* cited by examiner

ENGINEERED RECIRCULATING AQUACULTURE FISH POND AND FISH CULTURE METHOD

CROSS-REFERENCE TO RELATED APPLICATIONS

This application claims priority from Chinese Patent Application No. 202111109872.8, filed on Sep. 18, 2021, the contents of which are hereby incorporated by reference.

TECHNICAL FIELD

The disclosure belongs to the technical field of aquaculture, and particularly relates to an engineered recirculating aquaculture fish pond and a fish culture method.

BACKGROUND

Pond culturing was developed in China in 1970s, and up to now, most of them still are "water intake channel+culturing pond+drainage channel". However, this conventional aquaculture model is an extensive development mode at the cost of high density, high feeding rate, high labor costs, high energy consumption and the environment pollution. Under the "new economic normal", the disadvantages of aquaculture industry have also emerged that the existing aquaculture industry relies too much on resource investment, the fish ponds mostly use a single intercept net structure for filtering recirculating aquaculture, which causes the intercept net structure to be easily blocked locally, and the function of internal oxygen explosion structure is too single to cooperate with the whole pond, thereby resulting in low overall function. Therefore, aquaculture industry is facing a series of reforms, such as product upgrading, preventing overcapacity, adjusting the structure of aquaculture varieties, optimizing resource allocation and improving effective supply capacity.

At present, aquaculture mode and aquatic feed tend to maximize the growth rate of cultured varieties while ignoring the nutritional needs of the whole aquaculture system. In view of this, Nutritional Pond Science aims to develop a feed that is beneficial to cultured varieties and their environment at the same time, and in the culture process, the wastes may be utilized by microorganisms to promote the production of natural baits. This method uses low-cost crop residues as raw materials, and not only reduces feed cost, but also promotes material circulation. This disclosure may increase the feed utilization rate by 15-30 percent (%), while feeding the major cultured fishes, it can improve the pond production capacity to the maximum extent, keep the output of the major cultured fishes basically unchanged, minimize the accumulation and discharge of waste in the system, increase the economic benefits of the system, be environmentally friendly at the same time, and finally build a virtuous circle of material and energy flow in the circulating aquaculture system.

SUMMARY

Embodiments according to the present disclosure aim at solving or improving at least one of the above technical problems.

According to the disclosure, the objective of embodiments is to provide an engineered recirculating aquaculture fish pond.

The fish pond is arranged in a pit of a conventional culture pond, and includes a newly-built public pond ridge and an aeration water lifting device, the upper surface of the newly-built public pond ridge is respectively provided with a deep ditch and a shallow ditch, and the inner walls of the newly-built public pond ridge are respectively enclosed to form a fish culture area and a water quality keeping area; the aeration water lifting device is arranged on the inner wall of the deep ditch, and the aeration water lifting device is provided with nozzles facing at least two preset directions.

The engineered recirculating aquaculture fish pond is simple to operate, has strong adaptability to different culture environments or culture varieties, and is not only suitable for large-scale aquaculture enterprises but also suitable for small-scale farmers. The embodiment of the disclosure is provided with the aeration water lifting device so as to simultaneously carry out aeration and drainage, further reduce the use of electric equipment, decrease the production cost as well as maintenance cost, improve the cost performance of single equipment, and save the internal use space of the pond. Moreover, in the embodiment of the disclosure, the nozzles are arranged in more than two directions, which are convenient for carrying out aeration in different directions, dispersing impurities carried in water to make the impurities be uniformly dispersed in the deep ditch, intercepting of the dispersion, reducing local blockage of the device, improving the single utilization rate of the intercept structure, and at the same time, preventing heavier impurities from accumulating at the channel bottom of the deep ditch.

In addition, the technical solution of embodiments of this disclosure also has the following additional technical features:

In an embodiment, the deep ditch is respectively communicated with the fish culture area and the water quality keeping area, and the deep ditch includes: a first trench bottom cushion, first brick side walls, and first intercept nets. The first trench bottom cushion is horizontally laid, the bottom of the first trench bottom cushion is 20 centimeters (cm)-30 cm higher than the bottom of the conventional culture pond, and the front-back width of the first trench bottom cushion is 70 cm-90 cm; the first brick side walls are respectively arranged at the front and rear ends of the first trench bottom cushion; and the first intercept nets are respectively arranged at the left and right ends of the first trench bottom cushion.

In this embodiment, the deep ditch leads the water in the water quality keeping area into the fish culture area. The ditch bottom is paved with the first trench bottom cushion to tamp, and then levelled with concrete cushion to ensure that the deep ditch not collapses or surface fractures. The first brick side walls are perpendicular to the first trench bottom cushion, and are made of brick or reinforced concrete structure, which improves the stability of the overall strength. Moreover, the first intercept nets on both sides may intercept the flowing water twice, so as to ensure that there are no excessive impurities in the flowing water to further affect the water quality.

In an embodiment, the shallow ditch is respectively communicated with the fish culture area and the water quality keeping area, and the shallow ditch includes: a second trench bottom cushion, second brick side walls, and second intercept nets; the second trench bottom cushion is horizontally laid, the bottom of the second trench bottom cushion is 40 cm-60 cm lower than the upper opening of the conventional culture pond, and the front-back width of the second trench bottom cushion is 70 cm-90 cm; the second brick side walls are respectively arranged at the front and rear ends of the second trench bottom cushion; and the second intercept nets are respectively arranged at the left and right ends of the second trench bottom cushion.

In this embodiment, the shallow ditch leads the water in the water quality keeping area into the fish culture area. The ditch bottom is paved with the second trench bottom cushion to tamp, and then levelled with concrete cushion to ensure that the shallow ditch not collapses or surface fractures. The second brick side walls are perpendicular to the second trench bottom cushion, and are made of brick or reinforced concrete structure, which improves the stability of the overall strength. Moreover, the second intercept nets on both sides may intercept the flowing water twice, so as to ensure that there are no excessive impurities in the flowing water to further negatively affect the water quality.

In an embodiment, the aeration water lifting device includes: a support frame, and an aeration pipe; the top of which is provided with a waterproof cavity, the waterproof cavity is fixedly provided with an air pump, and the air outlet end of the air pump is fixedly connected with a first air inlet pipe and a second air inlet pipe respectively; the air inlet of the aeration pipe is fixedly connected with a first air inlet pipe and a second air inlet pipe respectively, and is internally communicated with each other, and the aeration pipe is provided with nozzles facing at least two preset directions, including at least one horizontal direction and at least one the vertical direction.

According to this embodiment, the support frame is used to integrally place and fix the aeration water lifting device, and the waterproof cavity prevents the air pump from being corroded by running water in long-term use. The air pump is communicated with the first air inlet pipe and the second air inlet pipe by a three-way joint, and the nozzles arranged on the aeration pipe blow the gas pushed out by the air pump into the water. By blowing in at least two directions, the flowing water flows towards the fish culture area, and the internal circulation is accelerated, and at the same time, the impurities in the water are redistributed, which not only prevents the heavy impurities from precipitating and accumulating, but also makes the impurities carried by the flowing water uniform.

In an embodiment, the aeration water lifting device further includes: a plate arrangement frame, the side wall of the plate arrangement frame is provided with pilot holes, the inner wall of the pilot holes is rotatably connected with the aeration pipe, and at least one pilot hole is transversely arranged.

In this embodiment, the aeration pipe may be fixed and rotationally adjusted by the pilot holes in the plate arrangement frame, so that the aeration pipe may be adjusted in multi-directions, and the impurities in the water may be intercepted in the intercept net evenly.

In an embodiment, the right-side wall of the support frame is fixedly provided with fixed rails, the inner wall of the fixed rails is fixedly provided with a mounting block, and the side wall of the mounting block is fixedly connected with the outer wall of the aeration pipe.

In this embodiment, the aeration pipe may be adjusted at different heights through the cooperation of the fixed rails and the mounting block, so as to adapt to the excretions produced by different fish, and achieve the same predetermined effect when facing different impurities.

In an embodiment, the right end of the inner wall of the water quality keeping area is fixedly provided with a diversion wall, and the left end of the diversion wall and the left end of the inner wall of the water quality keeping area are provided with water outlets.

In this embodiment, the water flow in the water quality keeping area is directional by the diversion wall, which avoids turbulence caused by the contact of water flows in opposite directions, and facilitates the water in the water quality keeping area flowing effectively; moreover, the water outlet helps the water flow in the water quality keeping area to circulate and reduces the internal flow resistance.

In an embodiment, through optimizing the feed formula and adding carbon source in compound feed, the carbohydrate content is increased by 15%-25%, the protein content is reduced by 6%-14%; furthermore, through adding starch in compound feed, the reproduction of natural biological bait in the pond is accelerated.

In this embodiment, low-cost crop residues are used as raw material, which significantly reduces the feed cost, not only keeps the output of major cultured fishes basically unchanged, but also minimizes the accumulation and discharge of waste in the system, thus being environmentally friendly and increasing the economic benefits of the system.

In an embodiment, filter-feeding fish with a size of 50-100 g/fish are fed into the water quality keeping area.

In this embodiment, matters eaten by filter-feeding fish in the water quality keeping area are absorbed and converted into protein, which promotes the double circulation of matters and energy in the aquaculture system.

Advantages of the embodiments of the disclosure will become obvious in the following description, or may be achieved in practice according to the embodiments of the disclosure.

DESCRIPTION OF REFERENCE NUMERALS

1: conventional culture pond, 2: newly-built public pond ridge, 3: deep ditch, 31: first trench bottom cushion, 32: first brick side wall, 33: first intercept net, 4: shallow ditch, 41: second trench bottom cushion, 42: second brick side wall, 43: second intercept net, 5: fish culture area, 6: water inlet pipe, 7: water quality keeping area, 8: drainage pipe, 9: diversion wall, 10: water outlet, 11: aeration water lifting device, 1101: support frame, 1102: air pump, 1103: first air inlet pipe, 1104: second air inlet pipe, 1105: aeration pipe, 1106: nozzle, 1107: transfer hose, 12: plate arrangement frame, 1201: pilot hole, 1202: holding tank, 13: fixed rail, 14: mounting block, 15: exhaust tube, 16: sloping baffle.

DETAILED DESCRIPTION OF THE EMBODIMENTS

In order to facilitate further understanding of the content, characteristics and advantages of the disclosure, the detailed description is as follows with the accompanying drawings. It should be noted that the embodiments of this disclosure and the features in the embodiments can be combined with each other without conflict.

Many specific details are set forth in the following description to facilitate a full understanding of the disclosure. However, the disclosure can also be implemented in other ways different from those described here. Therefore, the scope of protection of the disclosure is not limited by the specific embodiments disclosed below.

Figure 1:
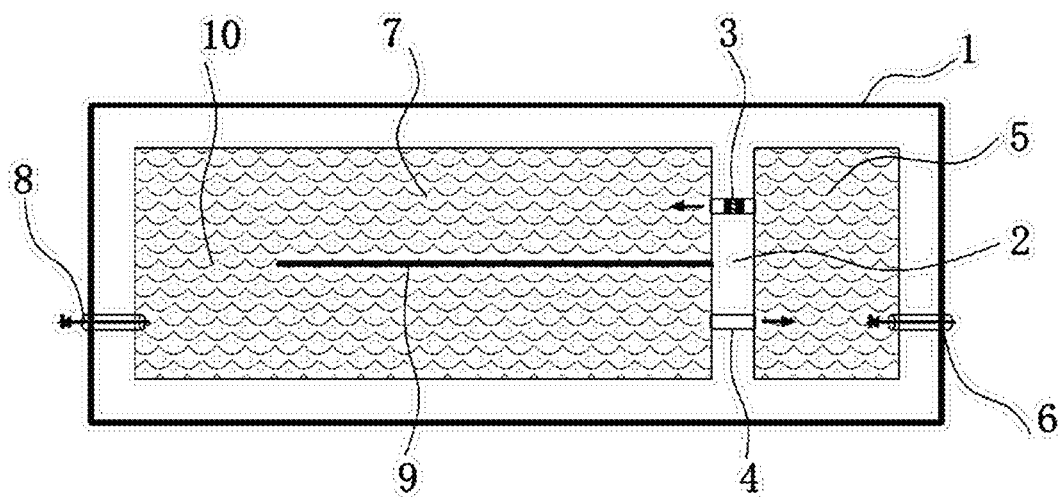
FIG. 1 shows a schematic structural diagram of this disclosure.
Figure 2:
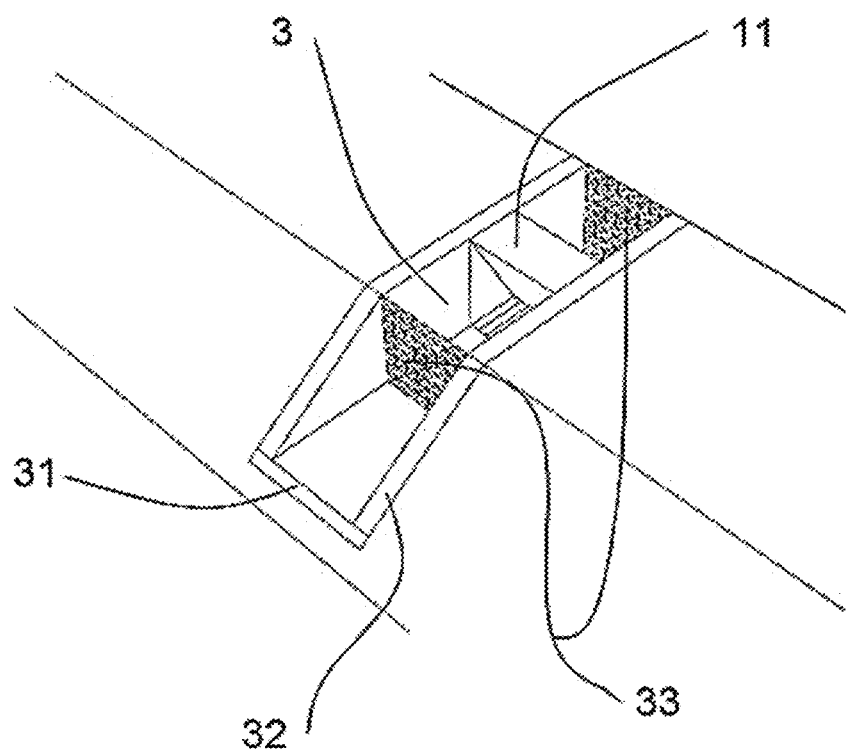
FIG. 2 shows a schematic structural diagram of the deep ditch of this disclosure.
Figure 3:
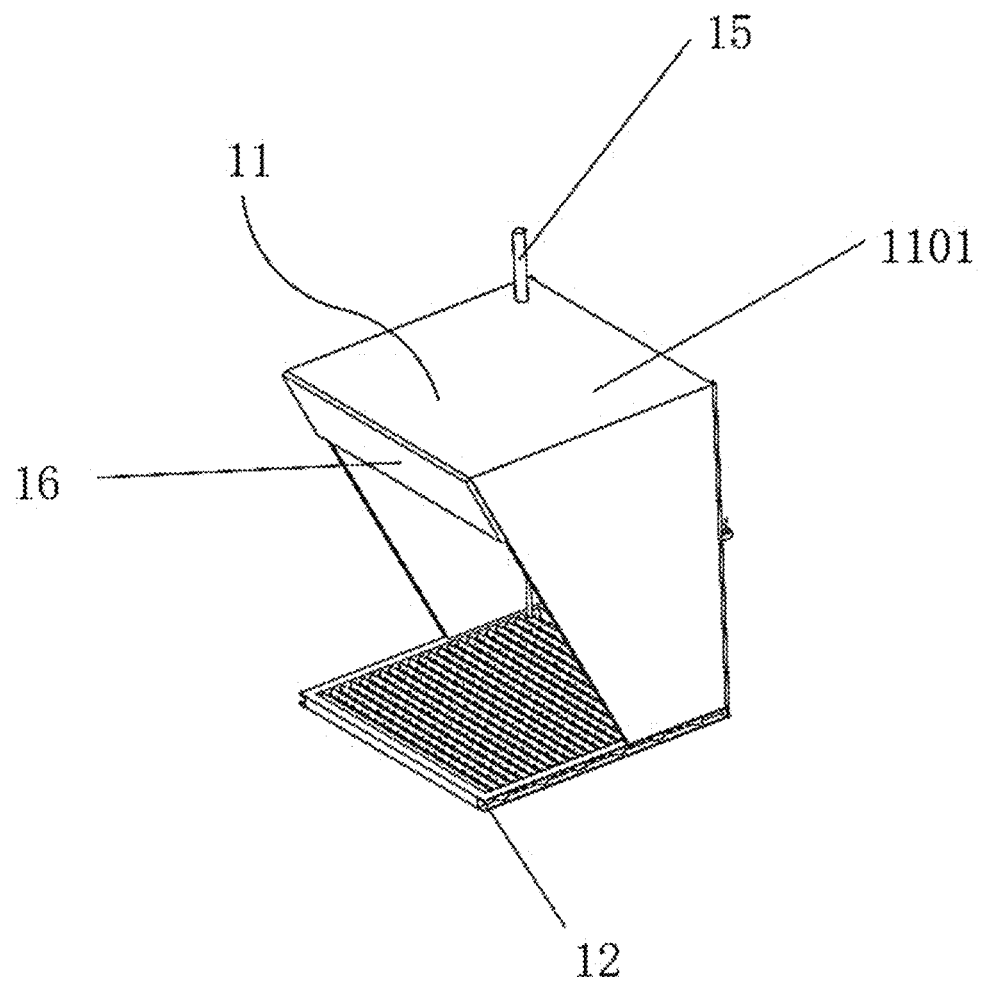
FIG. 3 shows a schematic structural diagram of the aeration water lifting device of this disclosure.
Figure 4:
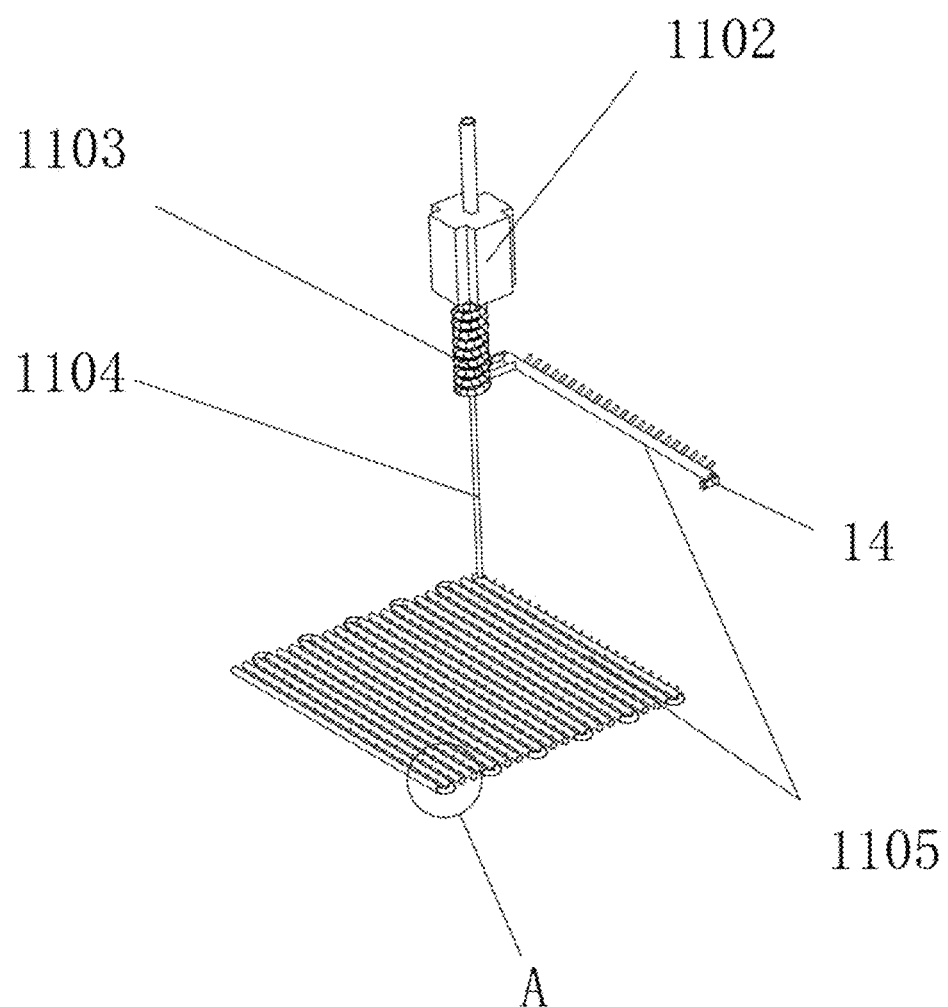
FIG. 4 shows a schematic structural diagram of an air pump and its connecting structure of this disclosure.
Figure 5:
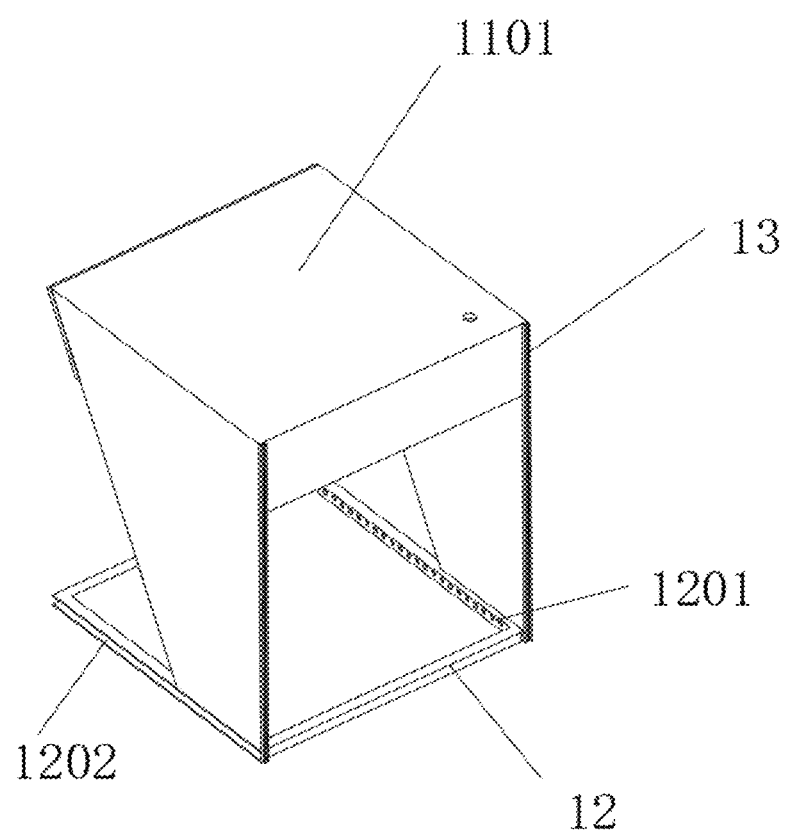
FIG. 5 shows a schematic structural diagram of the support frame and its connecting structure of this disclosure.
Figure 6:
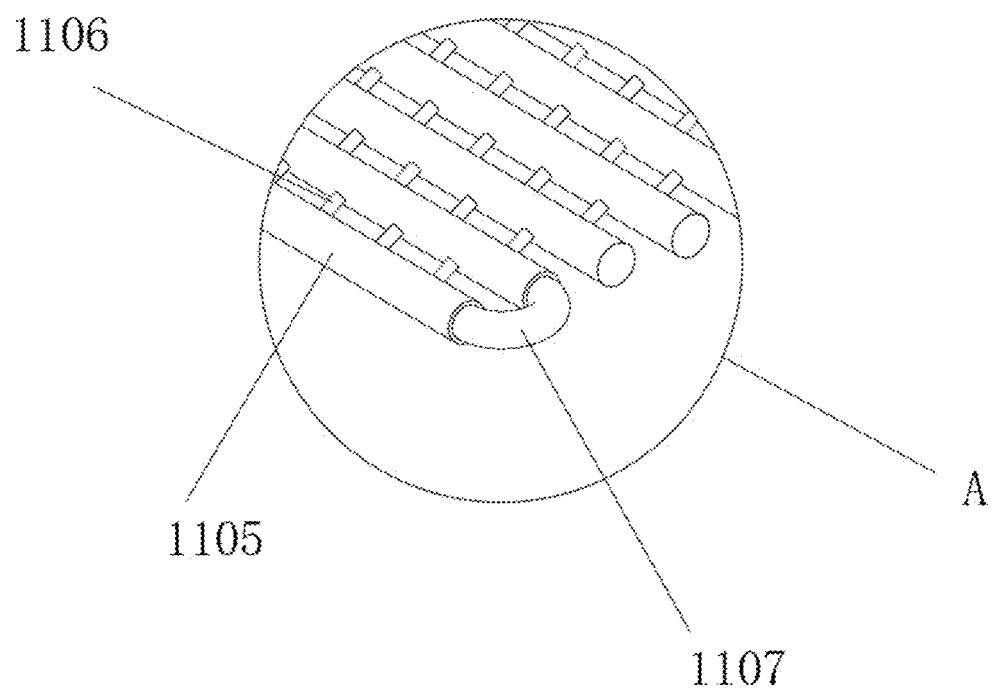
FIG. 6 shows an enlarged schematic diagram at A in FIG. 4.
Figure 7:
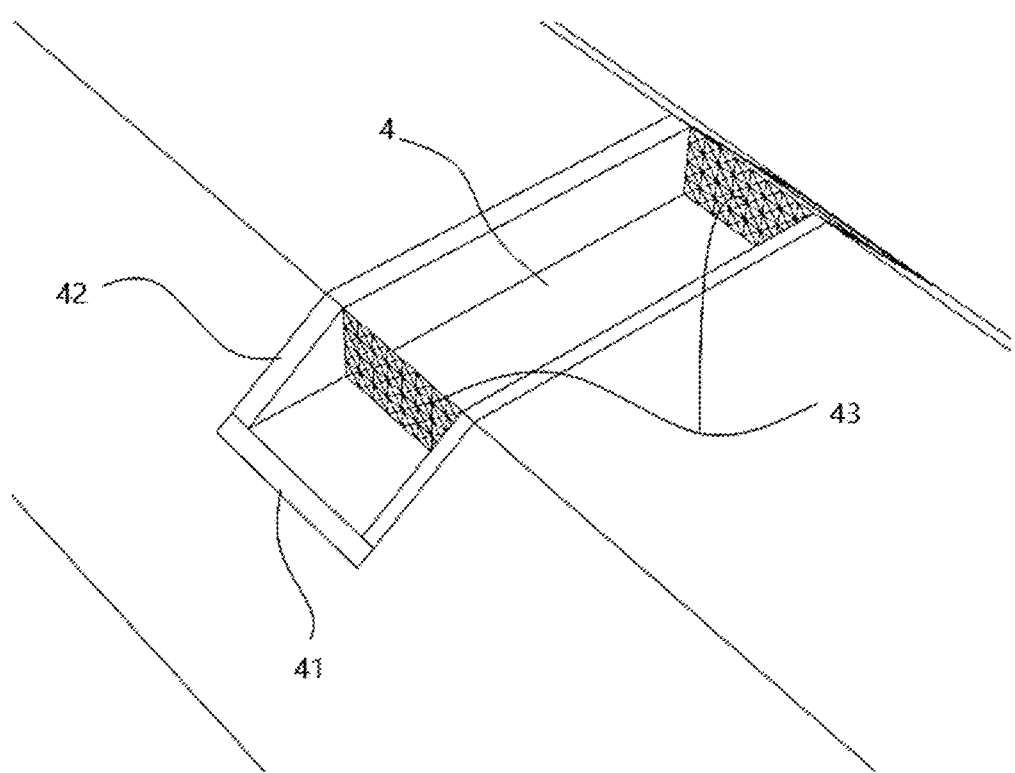
FIG. 7 shows a schematic structural diagram of the shallow ditch of this disclosure.

With reference to FIG. 1-FIG. 7, an embodiment of the disclosure provides an engineered recirculating aquaculture fish pond, which is arranged in the conventional culture pond 1, and includes: a newly-built public pond ridge 2 and an aeration water lifting device 11, the upper surface of the newly-built public pond ridge 2 is respectively provided with a deep ditch 3 and a shallow ditch 4, and the inner walls of the newly-built public pond ridge 2 are respectively enclosed to form a fish culture area 5 and a water quality keeping area 7; the aeration water lifting device 11 is arranged on the inner wall of the deep ditch 3, and the aeration water lifting device 11 is provided with nozzles 1106 facing at least two preset directions.

According to the disclosure, the engineered recirculating aquaculture fish pond is simple to operate, has strong adaptability to different culture environments or culture varieties, and is not only suitable for large-scale aquaculture enterprises but also suitable for small-scale farms. The embodiment of the disclosure is provided with the aeration water lifting device 11 so as to simultaneously carry out aeration and drainage, further reduce the use of electric equipment, decrease the production cost as well as maintenance cost, improve the cost performance of single equipment, and save the internal use space of the pond. Moreover, in this embodiment of the disclosure, the nozzles 1106 are arranged in more than two directions, which are convenient for carrying out aeration in different directions, dispersing impurities carried in water to make the impurities be uniformly dispersed in the deep ditch 3, intercepting of the dispersion, reducing local blockage of the device, improving the single utilization rate of the intercept structure, and at the same time, preventing heavier impurities from accumulating at the channel bottom of the deep ditch 3.

In an embodiment, the nozzles 1106 are placed at any angle of 0 to 90 degrees with the horizontal plane in the direction toward the fish culture area 5, so as to form multi-layered oxygen blowing direction. In the direction from the water quality keeping area 7 to the fish culture area 5, the elevation angle of the nozzles 1106 may be increased by three degrees in turn for each row of nozzles, and the nozzles 1106 in adjacent rows (the nozzles 1106 on the adjacent aeration pipes 1105) are staggered from front to back.

In an embodiment, the area ratio of the fish culture area 5 to the water quality keeping area 7 is 1:4, so that the water quality may be fully recovered. The conventional fish pond is 1.5-2.5 meters (m) deep and the slope ratio is 1:1.5-2.5, which ensures that the depth and ratio of the fish pond will not be designed at will.

In an embodiment, the water quality keeping area 7 is provided with a drainage pipe 8 to discharge the water in time when it is difficult to recover water quality; and the fish culture area 5 is provided with a water inlet pipe 6 to import clean water in time when the internal water quantity is too small, thus ensuring the normal survival of fish.

In any of the above embodiments, as shown in FIG. 1-FIG. 7, the deep ditch 3 is respectively connected with the fish culture area 5 and the water quality keeping area 7, and the deep ditch 3 includes as follows: a first trench bottom cushion 31, first brick side walls 32, and first intercept nets 33. The first trench bottom cushion 31 is horizontally laid, the bottom of the first trench bottom cushion 31 is 20 cm-30 cm higher than the bottom of the conventional culture pond 1, and the front-back width of the first trench bottom cushion 31 is 70 cm-90 cm; the first brick side walls 32 are respectively arranged at the front and rear ends of the first trench bottom cushion 31; the first intercept nets 33 are respectively arranged at the left and right ends of the first trench bottom cushion 31.

In this embodiment, the deep ditch 3 leads the water in the water quality keeping area 7 into the fish culture area 5. The ditch bottom is paved with the first trench bottom cushion 31 to tamp, and then levelled with concrete cushion to ensure that the deep ditch 3 not collapses or surface fractures. The first brick side walls 32 are perpendicular to the first trench bottom cushion 31, and are made of brick or reinforced concrete structure, which improves the stability of the overall strength. Moreover, the first intercept nets 33 on both sides may intercept the flowing water twice, so as to ensure that there are no excessive impurities in the flowing water to further affect the water quality.

In any of the above embodiments, as shown in FIG. 1-FIG. 7, the shallow ditch 4 is respectively communicated with the fish culture area 5 as well as the water quality keeping area 7, and the shallow ditch 4 includes: a second trench bottom cushion 41, second brick side walls 42, and second intercept nets 43. The second trench bottom cushion 41 is horizontally laid, the bottom of the second trench bottom cushion 41 is 40 cm-60 cm lower than the upper opening of the conventional culture pond 1, and the front-back width of the second trench bottom cushion 41 is 70 cm-90 cm; the second brick side walls 42 are respectively arranged at the front and rear ends of the second trench bottom cushion 41; the second intercept nets 43 are respectively arranged at the left and right ends of the second trench bottom cushion 41.

In the embodiment, the shallow ditch 4 leads the water in the water quality keeping area 7 into the fish culture area 5. The ditch bottom is paved with the second trench bottom cushion 41 to tamp, and then levelled with concrete cushion to ensure that the shallow ditch 4 not collapses or surface fractures. The second brick side walls 42 are perpendicular to the second trench bottom cushion 41, and are made of brick or reinforced concrete structure, which improves the stability of the overall strength. Moreover, the second intercept nets 43 on both sides may intercept the flowing water twice, so as to ensure that there are no excessive impurities in the flowing water to further affect the water quality.

In any of the above embodiments, as shown in FIG. 1-FIG. 7, the aeration water lifting device 11 includes as follows: a support frame 1101, and an aeration pipe 1105. The top of support frame 1101 is provided with a waterproof cavity, the waterproof cavity is fixedly provided with an air pump 1102, and the air outlet end of the air pump 1102 is fixedly connected with a first air inlet pipe 1103 and a second air inlet pipe 1104 respectively; the air inlet of the aeration pipe 1105 is fixedly connected with a first air inlet pipe 1103 and a second air inlet pipe 1104 respectively, and is internally communicated with each other, and the aeration pipe 1105 is provided with nozzles 1106 facing at least two preset directions, the preset directions include at least one horizontal direction and at least one vertical direction.

In the embodiment, the support frame 1101 is used to integrally place and fix the aeration water lifting device 11, and the waterproof cavity prevents the air pump 1102 from being corroded by running water in long-term use. The air pump 1102 is communicated with the first air inlet pipe 1103 and the second air inlet pipe 1104 by a three-way joint, and the nozzles 1106 arranged on the aeration pipe 1105 blow the gas pushed out by the air pump 1102 into the water. By blowing in at least two directions, the flowing water flows towards the fish culture area 5, and the internal circulation is accelerated, and at the same time, the impurities in the water are redistributed, which not only prevents the heavy impurities from precipitating and accumulating, but also makes the impurities carried by the flowing water uniform.

In an embodiment, the aeration pipes 1105 may be rotated separately for angle adjustment and vertical adjustment of up-and-down movement. The different angle adjustments at the bottom enable the nozzles 1106 to generate airflow in different directions, which may make the impurities in the water rise stepwise, and further make impurities in the water uniformly distribute; through the adjustment of different heights, the nozzles 1106 may spray at different heights, so that the sprayed airflow may drive impurities in the water from different heights, and may adapt to the different impurities caused by different fish.

Specifically, the first air inlet pipe 1103 is a spirally arranged hose, so as to expand and contract.

In any of the above embodiments, as shown in FIG. 1-FIG. 7, the aeration water lifting device 11 further includes: a plate arrangement frame 12, the side wall of the plate arrangement frame 12 is provided with pilot holes 1201, the inner wall of the pilot holes 1201 is rotatably connected with the aeration pipe 1105, and at least one pilot hole 1201 is transversely arranged.

In the embodiment, the aeration pipe 1105 may be fixed and rotationally adjusted by the pilot holes 1201 in the plate arrangement frame 12, so that the aeration pipe 1105 may be adjusted in multi-direction, and the impurities in the water may be intercepted in the intercept net evenly.

In an embodiment, the front and rear side walls of the plate arrangement frame 12 are provided with grooves, so that adjacent aeration pipes 1105 may be communicated with each other through transfer hoses 1107, and further transversely arranged aeration pipes 1105 may work simultaneously.

In any of the above embodiments, as shown in FIG. 1-FIG. 7, the right-side wall of the support frame 1101 is fixedly provided with fixed rails 13, the inner wall of the fixed rails 13 is fixedly provided with a mounting block 14, and the side wall of the mounting block 14 is fixedly connected with the outer wall of the aeration pipe 1105.

In the embodiment, the aeration pipe 1105 may be adjusted at different heights through the cooperation of the fixed rails 13 and the mounting block 14, so as to adapt to the excretions produced by different fish, and achieve the same predetermined effect when facing different impurities. The mounting block and the fixed rails are fixed with perforated bolts, and more than three threaded holes are longitudinally arranged in the fixed rails for fixing at different heights.

In an embodiment, the left side wall of the support frame 1101 is provided with a sloping baffle 16, which may guide the floating objects on the water surface to sink, so as to be driven by running water and avoid accumulating around the support frame 1101.

In an embodiment, the upper surface of the support frame 1101 is provided with exhaust tube 15, which is communicated with the air inlet end of the air pump 1102, so as to facilitate the pumping of the air pump 1102.

In any of the above embodiments, as shown in FIG. 1-FIG. 7, the right end of the inner wall of the water quality keeping area 7 is fixedly provided with a diversion wall 9, and the left end of the diversion wall 9 and the left end of the inner wall of the water quality keeping area 7 are provided with water outlets 10.

In the embodiment, the water flow in the water quality keeping area 7 is directional by the diversion wall 9, which avoids turbulence caused by the contact of water flows in opposite directions, and facilitates the water in the water quality keeping area 7 flowing effectively; moreover, the water outlet 10 helps the water flow in the water quality keeping area 7 to circulate and reduces the internal flow resistance.

Specifically, the diversion wall 9 is made of modified PVC hard impervious material.

In any of the above embodiments, as shown in FIG. 1-FIG. 7, through optimizing the feed formula and adding carbon source in compound feed, the carbohydrate content is increased by 15%-25%, the protein content is reduced by 6%-14%; furthermore, through adding starch in compound feed, the reproduction of natural biological bait in the pond is accelerated.

In the embodiment, low-cost crop residues are used as raw material, which significantly reduces the feed cost, not only keeps the output of major cultured fishes basically unchanged, but also minimizes the accumulation and discharge of waste in the system, thus being environmentally friendly and increasing the economic benefits of the system.

In any of the above embodiments, as shown in FIG. 1-FIG. 7, filter-feeding fish with a size of 50-100 g/fish are fed into the water quality keeping area 7.

In the embodiment, filter-feeding fish fed in the water quality keeping area are purified, absorbed and converted into protein, which promotes the double circulation of matter and energy in the aquaculture system.

The specific methods are as follows:

Ditches with a clear width of 80 cm are ditched at ¼ width and ¾ width of the newly-built public pond ridge 2, namely the deep ditch 3 and the shallow ditch 4, which connect the two functional areas, one ditch is the deep trench 3, the bottom of which is 20-30 cm higher than the bottom of the pond, the other ditch is the shallow ditch 4, the bottom of which is 50 cm lower than the upper opening of the pond. The bottom of the trench is tamped, and then levelled with concrete cushion. Two sides of the trench are perpendicular to the levelled trench bottom, and are made of brick or reinforced concrete.

Movable and replaceable stainless steel intercept nets are installed at two ends of the two ditches near the pond, the intercept nets are fixed in the ditches through clamping grooves, and the mesh aperture is determined according to the cultured varieties and the specifications of the varieties.

By optimizing the feed formula, the content of starch is increased by about 20%, the content of protein is reduced by about 10%; in addition, C source is added into the compound feed, so that the wastes in the breeding process may be utilized by microorganisms to promote the production of natural bait.

Filter-feeding fishes with the size of 50-100 g/fish such as silver carp and bighead carp are stocked in water quality keeping area.

In the embodiments of this disclosure, it should be understood that the azimuth or positional relationship indicated by the terms "longitudinal", "transverse", "upper", "lower", "front", "rear", "left", "right", "vertical", "horizontal", "top", "bottom", "inner", "outer" and so on is based on the azimuth or positional relationship shown in the drawings for describing this disclosure, rather than indicating or implying that the device or element must have a specific orientation, be constructed and operated in a specific orientation, so it cannot be understood as a limitation of the present disclosure.

The above embodiments only describe the preferred mode of the disclosure and do not limit the scope of the disclosure. Without departing from the design spirit of the disclosure, various modifications and improvements made by those skilled in the art to the technical solutions of the disclosure shall fall within the protection scope determined by the claims of the disclosure.

What is claimed is:

1. An engineered recirculating aquaculture fish pond, arranged in a pit of a culture pond, and wherein the engineered recirculating aquaculture fish pond comprises: a newly-built public pond ridge, wherein an upper surface of the newly-built public pond ridge is provided with a deep ditch and a shallow ditch, and inner walls of the newly-built public pond ridge are respectively enclosed to form a fish culture area and a water quality keeping area; and an aeration water lifting device, arranged on inner walls of the deep ditch, wherein the aeration water lifting device comprises: a support frame, wherein a top of the support frame is provided with a waterproof cavity, the waterproof cavity is fixedly provided with an air pump, and an air outlet end of the air pump is fixedly connected to a first air inlet pipe and a second air inlet pipe; aeration pipes, wherein air inlets of the aeration pipes are fixedly connected to the first air inlet pipe and the second air inlet pipe respectively, and the aeration pipes are internally communicated with each other, and each of the aeration pipes is provided with nozzles facing at least two preset directions, wherein the at least two preset directions comprise at least one horizontal direction and at least one vertical direction; wherein the aeration water lifting device further comprises: a plate arrangement frame, wherein a side wall of the plate arrangement frame is provided with pilot holes, inner walls of the pilot holes are rotatably connected to the aeration pipes respectively, and the pilot holes comprise at least one pilot hole arranged in a transverse direction; and wherein a right-side wall of the support frame is fixedly provided with fixed rails, an inner wall of each of the fixed rails is fixedly provided with a mounting block, and side walls of the mounting blocks of the fixed rails are fixedly connected to an outer wall of one of the aeration pipes.

2. The engineered recirculating aquaculture fish pond according to claim 1, wherein the deep ditch is connected to the fish culture area and the water quality keeping area, and the deep ditch comprises:
a first trench bottom cushion, wherein the first trench bottom cushion is horizontally laid, a bottom of the first trench bottom cushion is 20 cm-30 cm higher than a bottom of the culture pond, and a front-back width of the first trench bottom cushion is 70 cm-90 cm;
first brick side walls, wherein the first brick side walls are respectively arranged at front and rear ends of the first trench bottom cushion; and
first intercept nets, wherein the first intercept nets are respectively arranged at left and right ends of the first trench bottom cushion.

3. The engineered recirculating aquaculture fish pond according to claim 1, wherein the shallow ditch is connected to the fish culture area and the water quality keeping area, and the shallow ditch comprises:
a second trench bottom cushion, wherein the second trench bottom cushion is horizontally laid, a bottom of the second trench bottom cushion is 40 cm-60 cm lower than an upper opening of the culture pond, and a front-back width of the second trench bottom cushion is 70 cm-90 cm;
second brick side walls, wherein the second brick side walls are respectively arranged at front and rear ends of the second trench bottom cushion; and
second intercept nets, wherein the second intercept nets are respectively arranged at left and right ends of the second trench bottom cushion.

4. The engineered recirculating aquaculture fish pond according to claim 1, wherein an end of an inner wall of the water quality keeping area is fixedly provided with a diversion wall, and an end of the diversion wall and the other end of the inner wall of the water quality keeping area are provided with water outlets.

* * * * *